(12) United States Patent
Mai et al.

(10) Patent No.: US 11,815,758 B2
(45) Date of Patent: Nov. 14, 2023

(54) LIQUID CRYSTAL DISPLAY PANEL AND METHOD FOR MAKING SAME, AND DISPLAY DEVICE

(71) Applicant: Century Technology (Shenzhen) Corporation Limited, Shenzhen (CN)

(72) Inventors: Chen-Fu Mai, New Taipei (TW); Yu Zhang, Shenzhen (CN); Lan-Qing Xiao, Shenzhen (CN); Min Hu, Shenzhen (CN); Meng-Chieh Tai, New Taipei (TW)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 0 days.

(21) Appl. No.: 17/868,225

(22) Filed: Jul. 19, 2022

(65) Prior Publication Data

US 2023/0152623 A1 May 18, 2023

(30) Foreign Application Priority Data

Nov. 18, 2021 (CN) .......................... 202111370916.2

(51) Int. Cl.
| | |
|---|---|
| *G02F 1/1335* | (2006.01) |
| *G02F 1/1368* | (2006.01) |
| *C03C 15/00* | (2006.01) |
| *C03C 19/00* | (2006.01) |
| *G02F 1/1333* | (2006.01) |

(52) U.S. Cl.
CPC ........ *G02F 1/133512* (2013.01); *C03C 15/00* (2013.01); *C03C 19/00* (2013.01); *G02F 1/1368* (2013.01); *G02F 1/133302* (2021.01); *G02F 1/133514* (2013.01); *G02F 2201/50* (2013.01); *G02F 2201/56* (2013.01)

(58) Field of Classification Search
None
See application file for complete search history.

(56) References Cited

U.S. PATENT DOCUMENTS

| | | | |
|---|---|---|---|
| 8,547,506 B2 | 10/2013 | Tsao et al. | |
| 2003/0134506 A1* | 7/2003 | Kim | H01J 11/12 438/637 |
| 2004/0146791 A1* | 7/2004 | Sakurada | G02B 5/201 430/7 |
| 2010/0033658 A1* | 2/2010 | Tsao | G02B 5/201 430/7 |

(Continued)

FOREIGN PATENT DOCUMENTS

TW 201007222 A 2/2010

*Primary Examiner* — Shan Liu
(74) *Attorney, Agent, or Firm* — ScienBiziP, P.C.

(57) ABSTRACT

A liquid crystal display panel which is viewable from a greater range of oblique viewing angles without apparent loss of contrast or color intensity includes a thin film transistor substrate, a color filter substrate, a liquid crystal layer between the color filter substrate and the thin film transistor substrate. The color filter substrate includes a glass substrate, a black matrix, and a color filter layer on the glass substrate. A surface of the glass substrate defines a plurality of grooves having different depths. Both the black matrix and the color filter layer are in the grooves. A thickness of the liquid crystal layer changes with depths of the plurality of grooves. A display device and a method for making the liquid crystal display panel are also provided.

9 Claims, 7 Drawing Sheets

(56) References Cited

U.S. PATENT DOCUMENTS

| | | | |
|---|---|---|---|
| 2013/0334169 A1* | 12/2013 | Tsao | G02F 1/133514 216/24 |
| 2016/0170260 A1* | 6/2016 | Wachi | G02B 5/201 359/741 |

* cited by examiner

LIQUID CRYSTAL DISPLAY PANEL AND METHOD FOR MAKING SAME, AND DISPLAY DEVICE

FIELD

The subject matter herein generally relates to displays, particularly relates to a liquid crystal display panel, a method for making the liquid crystal display panel, and a display device having the liquid crystal display panel.

BACKGROUND

When viewing a flat liquid crystal display from different directions, brightness, contrast, and colors of the display will be different from different viewing angles. When viewing the display screen with a sight line perpendicular to the display screen, the display effect is good and true. When squinting at the display screen, the picture contrast is low, and the color is poor.

A curved screen is more ergonomic than a flat screen, all parts of the ergonomic screen being an equal distance from the screen. However, a method of making a liquid crystal display curved screen is generally to bend a flat liquid crystal display panel to match a backlight plate with a certain curvature. However, due to an uneven stress of the glass substrate of the bent liquid crystal display panel and an inconsistent curvature of the thin film transistor substrate and the color filter substrate, the middle front viewing display effect of the liquid crystal display is also good; but squinting at the display screen still has a low contrast and poor color.

BRIEF DESCRIPTION OF THE DRAWINGS

Implementations of the present technology will now be described, by way of embodiments only, with reference to the attached figures.

DETAILED DESCRIPTION

Figure 1A:
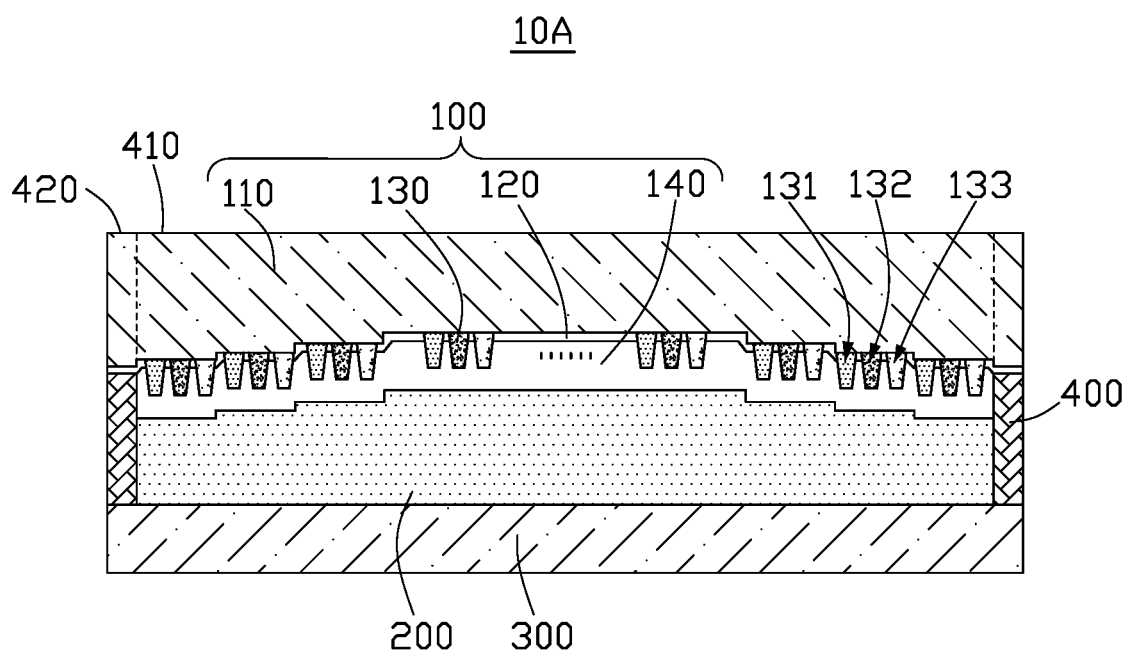
FIG. 1A is a sectional view of a liquid crystal display panel according to one embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

FIG. 1A illustrates a liquid crystal display panel 10A. The liquid crystal display panel 10A includes a color filter substrate 100, a liquid crystal layer 200, a thin film transistor substrate 300, and a frame 400. The thin film transistor substrate 300 is opposite to the color filter substrate 100. The liquid crystal layer 200 is between the color filter substrate 100 and the thin film transistor substrate 300. The frame 400 surrounds the liquid crystal layer 200 and connects to edges of both the thin film transistor substrate 300 and the color filter substrate 100 to maintain a certain distance between the thin film transistor substrate 300 and the color filter substrate 100. In addition, the frame 400 can also seal the liquid crystal layer 200 to prevent a leakage of liquid crystal and entry of external pollutants.

Figure 1B:
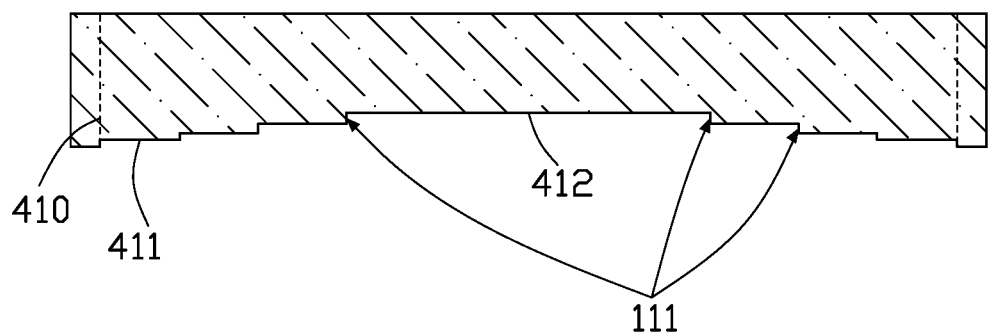
FIG. 1B is a sectional view of a glass substrate according to one embodiment of the present disclosure.
Figure 1C:
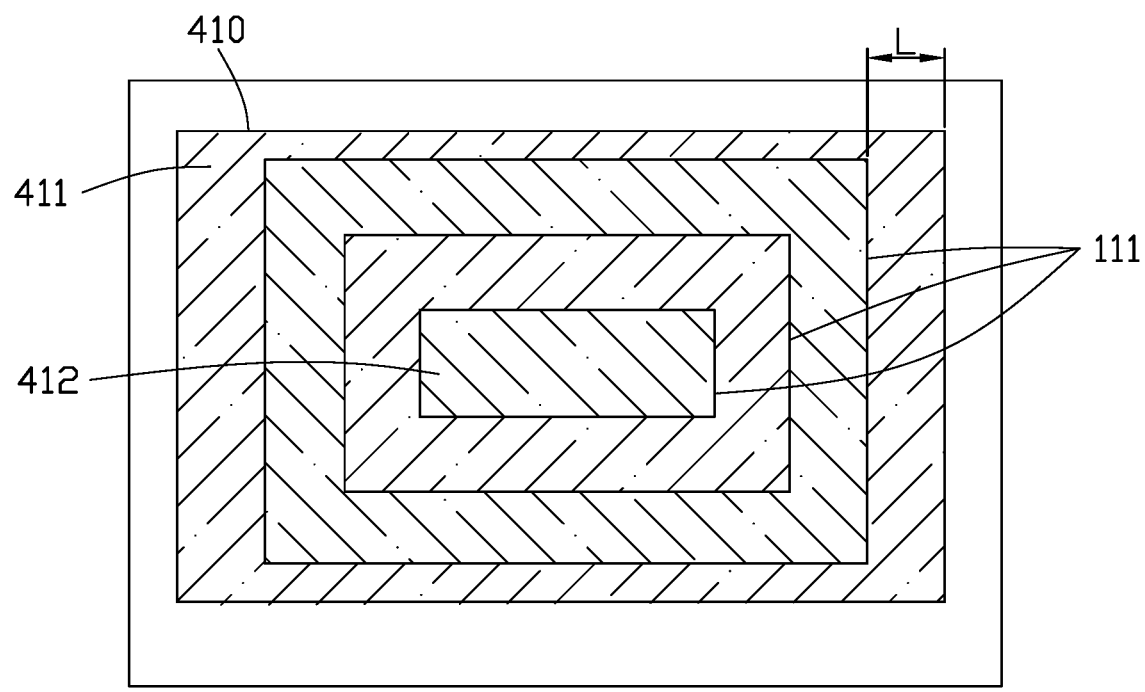
FIG. 1C is a top view of a glass substrate according to one embodiment of the present disclosure.

As shown in FIG. 1A and FIG. 1C, the liquid crystal display panel 10A includes a display area 410 and a non-display area 420 surrounding the display area 410. The frame 400 is located in the non-display area 420.

The color filter substrate 100 includes a glass substrate 110, a black matrix 120 on the glass substrate 110, a color filter layer 130 on the glass substrate 110, and a protecting layer 140 covering both the color filter layer 130 and the black matrix 120.

The color filter layer 130 includes red filter layers 131, green filter layers 132, and blue filter layers 133 on the glass substrate 110. The red filter layers 131, the green filter layers 132, and the blue filter layers 133 are spaced apart from each other and configured to filter out light having specific ranges of wavelengths from a white light source, so that light of different colors can be displayed.

The black matrix 120 is located between and surrounds the red filter layers 131, the green filter layers 132, and the blue filter layers 133 to absorb critical light of adjacent filter layers, reduce the color mixing interference between pixels, and prevent the deterioration of color contrast. On the other hand, the black matrix 120 is also formed at a position of the glass substrate 110 corresponding to the non-display area 420 to shade light in the non-display area 420.

As shown in FIG. 1B and FIG. 1C, a surface of the glass substrate 110 having the color filter layer 130 defines a plurality of grooves 111 having different depths in the display area 410. Adjacent grooves 111 have different depths and each groove 111 has a constant depth. The depths of the grooves 111 gradually increase in a direction from an edge region 411 of the display area 410 towards a center region 412 of the display area 410. A width L of each groove 111 is in a range of 0.8 cm-1.2 cm, and a depth difference between two adjacent grooves 111 is in a range of 0.1 µm-1 µm.

The width L of the grooves 111 and the number of grooves 111 in FIG. 1B and FIG. 1C do not reflect a true scale of the liquid crystal display panel, but are used only for the purpose of schematically explaining the content of the present disclosure. The number and distribution of the red filter layers 131, the green filter layers 132, and the blue filter layers 133 in the groove 111 in FIG. 1A do not reflect a true situation of the color filter substrate 100, but are used only for the purpose of schematically explaining the content of this disclosure. A shape of the boundary between adjacent grooves 111 in FIG. 1C does not reflect a true surface morphology of the glass substrate 110 and is only intended to schematically illustrate the content of the present disclosure.

In some embodiments, in the above liquid crystal display panel 10A, the width L of each groove 111 is 1 cm, and the depth difference between two adjacent grooves 111 is 0.1 µm.

In some embodiments, in the above liquid crystal display panel 10A, the width L of each groove 111 is 1 cm, and the depth difference between two adjacent grooves 111 is 1 µm.

The black matrix 120 and the color filter layer 130 are distributed in the grooves 111, and the protective layer 140 covers the color filter layer 130 and the black matrix 120. Corresponding to the grooves 111 having different depths, a thickness of the protective layer 140 is constant overall, so a surface of the protective layer 140 adjacent to the liquid crystal layer 200 is consistent with the surface of grooves 111, and the liquid crystal layer 200 follows the same general contours as the depths of the grooves 111. That is, corresponding to the grooves 111 having different depths on the surface of the glass substrate 110, the thickness of the liquid crystal layer 200 gradually increases in the direction from the edge region 411 of the display area 410 towards the center region 412 of the display area 410.

The liquid crystal display panel 10A is suitable for the situation in which the viewer look at horizontally. When the viewer's sight line falls from the center region 412 of the display area 410 to the edge region 411 of the display area 410, the thickness of the liquid crystal layer 200 becomes less, and the display angle of the liquid crystal display panel 10A becomes greater, which makes up for the difference in display caused by the change of viewing angle, and improves the low contrast and poor color when squinting.

Figure 2A:
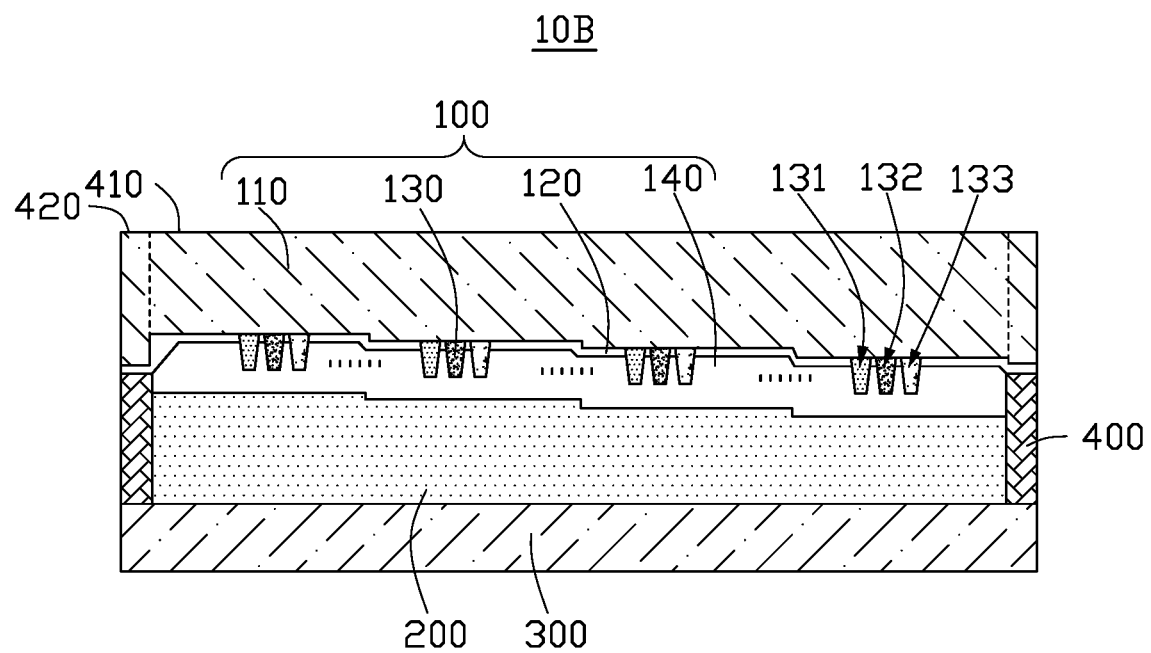
FIG. 2A is a sectional view of a liquid crystal display panel according to another embodiment of the present disclosure.

FIG. 2A illustrates another liquid crystal display panel 10B. The liquid crystal display panel 10B includes a color filter substrate 100, a liquid crystal layer 200, a thin film transistor substrate 300, and a frame 400. The thin film transistor substrate 300 is arranged opposite to the color filter substrate 100. The liquid crystal layer 200 is between the color filter substrate 100 and the thin film transistor substrate 300. The frame 400 surrounds the liquid crystal layer 200 and connects to edges of both the thin film transistor substrate 300 and the color filter substrate 100.

Figure 2B:
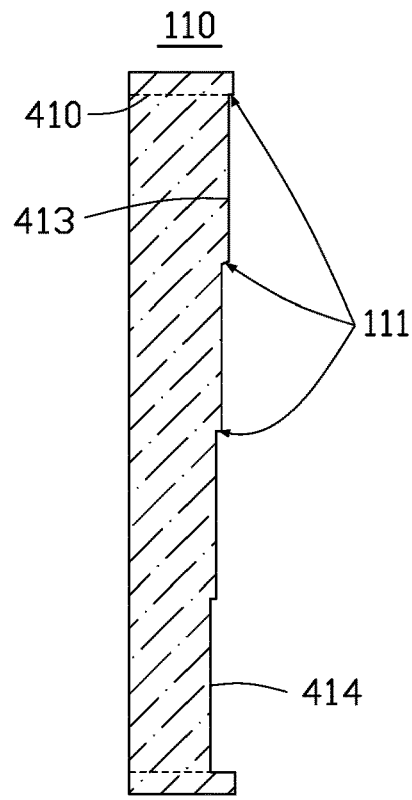
FIG. 2B is a sectional view of a glass substrate according to another embodiment of the present disclosure.
Figure 2C:
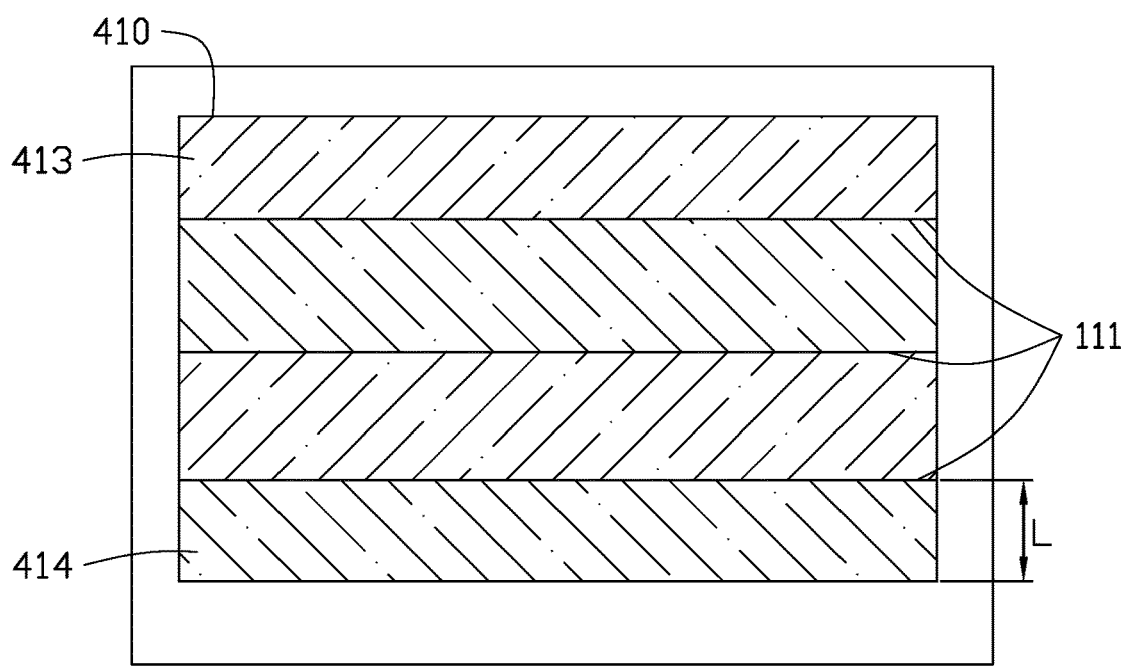
FIG. 2C is a top view of a glass substrate according to another embodiment of the present disclosure.

As shown in FIG. 2A and FIG. 2C, the liquid crystal display panel 10B includes a display area 410 and a non-display area 420 surrounding the display area 410. The frame 400 is located in the non-display area 420.

The color filter substrate 100 includes a glass substrate 110, a black matrix 120 on the glass substrate 110, a color filter layer 130 on the glass substrate 110, and a protecting layer 140 covering both the color filter layer 130 and the black matrix 120.

The color filter layer 130 includes red filter layers 131, green filter layers 132, and blue filter layers 133 on the glass substrate 110. The red filter layers 131, the green filter layers 132, and the blue filter layers 133 are spaced apart from each other and configured to filter out light having specific ranges of wavelengths from a white light source, so that light of different colors can be displayed.

The black matrix 120 is located between and surrounds the red filter layers 131, the green filter layers 132, and the blue filter layers 133, to absorb critical light of adjacent filter layers, reduce the color mixing interference between pixels, and not allow deterioration of color contrast. On the other hand, the black matrix 120 is also formed at a position of the glass substrate 110 corresponding to the non-display area 420 to shade light in the non-display area 420.

As shown in FIG. 2B and FIG. 2C, a surface of the glass substrate 110 having the color filter layer 130 defines a plurality of grooves 111 having different depths in the display area 410. The grooves 111 have different depths and each groove 111 has a constant depth. The depths of the grooves 111 gradually increases in a direction from a first side 413 of the display area 410 towards a second side 414 of the display area 410 opposite to the first side 413. A width L of each groove 111 is in a range of 0.8 cm-1.2 cm, and a depth difference between two adjacent grooves 111 is 0.1 µm-1 µm. In some embodiments, the first side 413 is the upper side (for example, a side close to an upper edge of the liquid crystal display panel 10B), and the second side 414 is the lower side (for example, a side close to a lower edge of the liquid crystal display panel 10B) when viewing the liquid crystal display panel 10B.

The width L of the grooves 111 and the number of grooves 111 in FIG. 2B and FIG. 2C do not reflect a true scale of the liquid crystal display panel, but are only for the purpose of schematically explaining the content of the present disclosure. The number and distribution of the red filter layers 131, the green filter layers 132 and the blue filter layers 133 in the groove 111 in FIG. 2A do not reflect a true situation of the color filter substrate 100, but are only for the purpose of schematically explaining the content of this disclosure. A shape of boundary between adjacent grooves 111 in FIG. 2C does not reflect a true surface morphology of the glass substrate 110 and is only intended to schematically illustrate the content of the present disclosure.

In some embodiments, in the above liquid crystal display panel 10B, the width L of each groove 111 is 1 cm, and the depth difference between two adjacent grooves 111 is 0.1 µm.

In some embodiments, in the above liquid crystal display panel 10B, the width L of each groove 111 is 1 cm, and the depth difference between two adjacent grooves 111 is 1 µm.

The black matrix 120 and the color filter layer 130 are distributed in the grooves 111, and the protective layer 140 covers the color filter layer 130 and the black matrix 120. Corresponding to the grooves 111 having different depths, a thickness of the protective layer 140 is generally constant, so a surface of the protective layer 140 adjacent to the liquid crystal layer 200 is consistent with the surface of grooves 111, and a thickness of the liquid crystal layer 200 maintains and follows the contours of the depths of the grooves 111. That is, corresponding to the grooves 111 having different depths on the surface of the glass substrate 110, the thickness of the liquid crystal layer 200 gradually increases in the direction from the first side 413 of the display area 410 towards the second side 414 of the display area 410.

The liquid crystal display panel 10A is suitable for the situation in which the viewer looks upwards. When the liquid crystal display panel 10B is suspended on a wall for example, the first side 413 of the display area 410 is farther away from the observer than the second side 414 of the display area 410. When the observer's sight line falls from the second side 414 of the display area 410 to the first side 413 of the display area 410, the thickness of the liquid crystal layer 200 becomes less, and the display angle of the liquid crystal display panel 10B becomes greater, which makes up for the difference in display caused by the change of viewing angle, and improves low contrast and poor color when the viewer is looking upwards.

Figure 3:
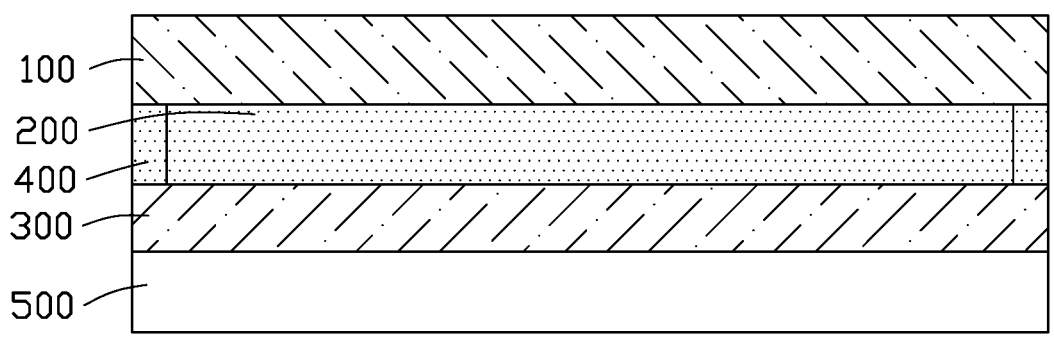
FIG. 3 shows a display device according to one embodiment of the present disclosure.

FIG. 3 illustrates a display device 20. The display device 20 includes the above-mentioned liquid crystal display panel 10A/10B and a backlight module 500. The backlight module 500 is located on a side of the liquid crystal display panel 10A/10B away from the display surface.

The display device 20 has the same advantages as the liquid crystal display panel compared with the prior art.

A method for making the above liquid crystal display panel is also provided. The method for making the liquid crystal display panel includes: providing a glass substrate; defining a plurality of grooves having different depths on a surface of the glass substrate, and corresponding to the positions of the grooves having different depths, a thickness of the liquid crystal layer and the depths of the grooves maintain the same general contours.

Figure 4:
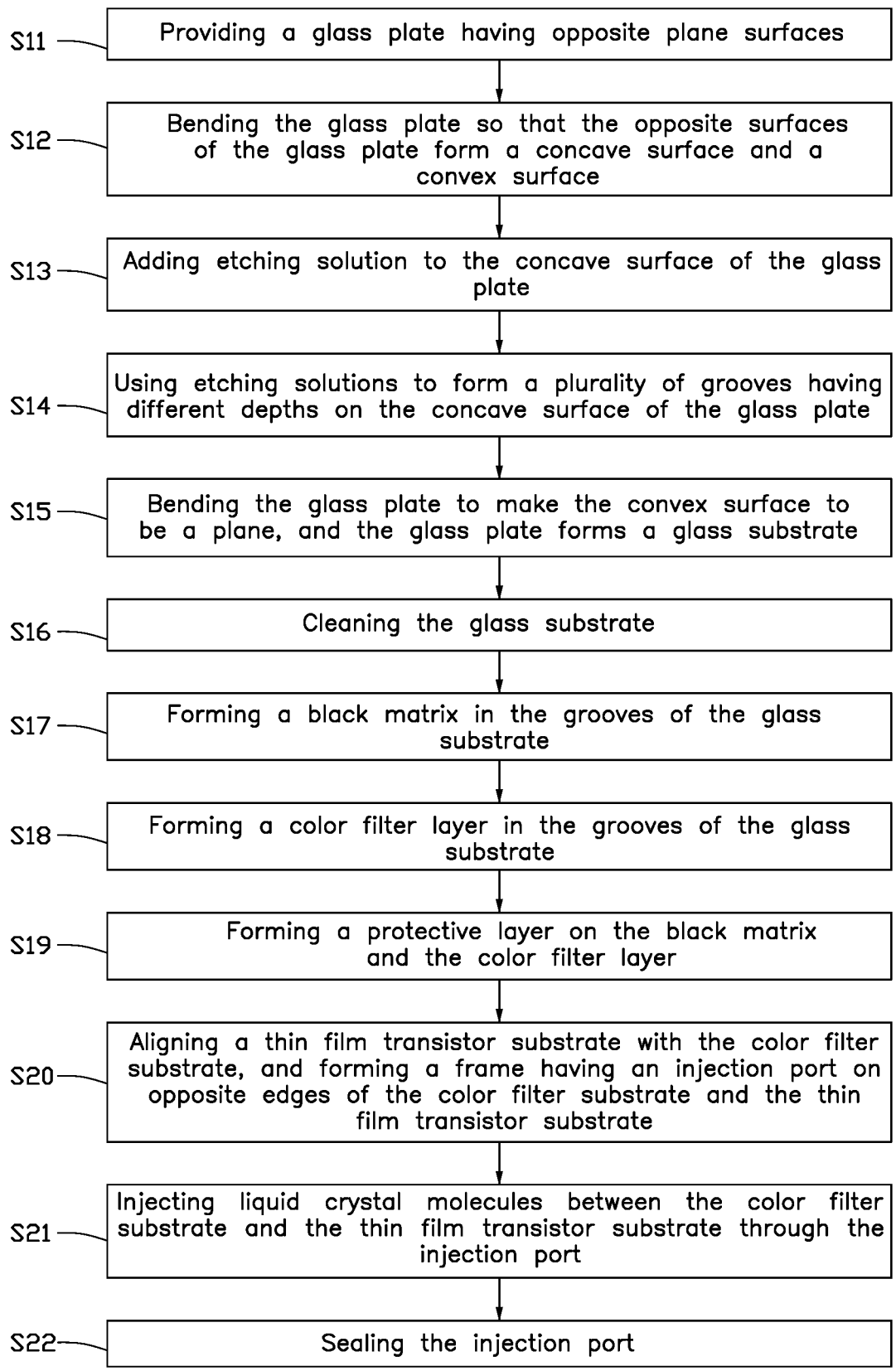
FIG. 4 is a flowchart of a method for making a liquid crystal display panel according to one embodiment of the present disclosure.

As shown in FIG. 4, a method for making the liquid crystal display panel includes the following steps.

Step S11, providing and cleaning a glass plate having opposite plane surfaces.

Step S12, bending the glass plate so that the opposite surfaces of the glass plate form a concave surface and a convex surface respectively.

Step S13, adding etching solutions to the concave surface of the glass plate.

Step S14, using etching solutions having different amounts or concentrations to different positions of the concave surface of the glass plate to form a plurality of grooves having different depths on the concave surface of the glass plate. Grooves formed at a position with more etching solution or higher concentration of etching solution are deeper, and grooves formed at the position with less etching solution or lower concentration of etching solution are shallower.

Step S15, bending the glass plate to make the convex surface a plane, and the glass plate forms a glass substrate.

Step S16, cleaning the glass substrate.

Step S17, forming a black matrix in the plurality of grooves of the glass substrate.

Step S18, forming a color filter layer in the plurality of grooves of the glass substrate. The color filter layer includes red filter layers, green filter layers, and blue filter layer, and the filter layers are spaced apart from each other by the black matrix.

Step S19, forming a protective layer on the black matrix and the color filter layer. A thickness of the protective layer is generally constant. Thus far, a color filter substrate is formed.

Step S20, aligning a thin film transistor substrate with the color filter substrate, and forming a frame on opposite edges of the color filter substrate and the thin film transistor substrate, so that the color filter substrate and the thin film transistor substrate are aligned and adhered together. The frame has an injection port.

Step S21, injecting liquid crystal molecules between the color filter substrate and the thin film transistor substrate through the injection port of the frame to form a liquid crystal layer whose thickness changes with the depths of the grooves of the glass substrate.

Step S22, sealing the injection port.

Another method for making the above liquid crystal display panel is also provided. The method includes: forming a glass substrate, the surface of the glass substrate is provided with a plurality of grooves having different depths, the surface corresponds to the positions of the grooves having different depths, the thickness of the liquid crystal layer maintains the same general contours as the depths of the grooves.

Figure 5:
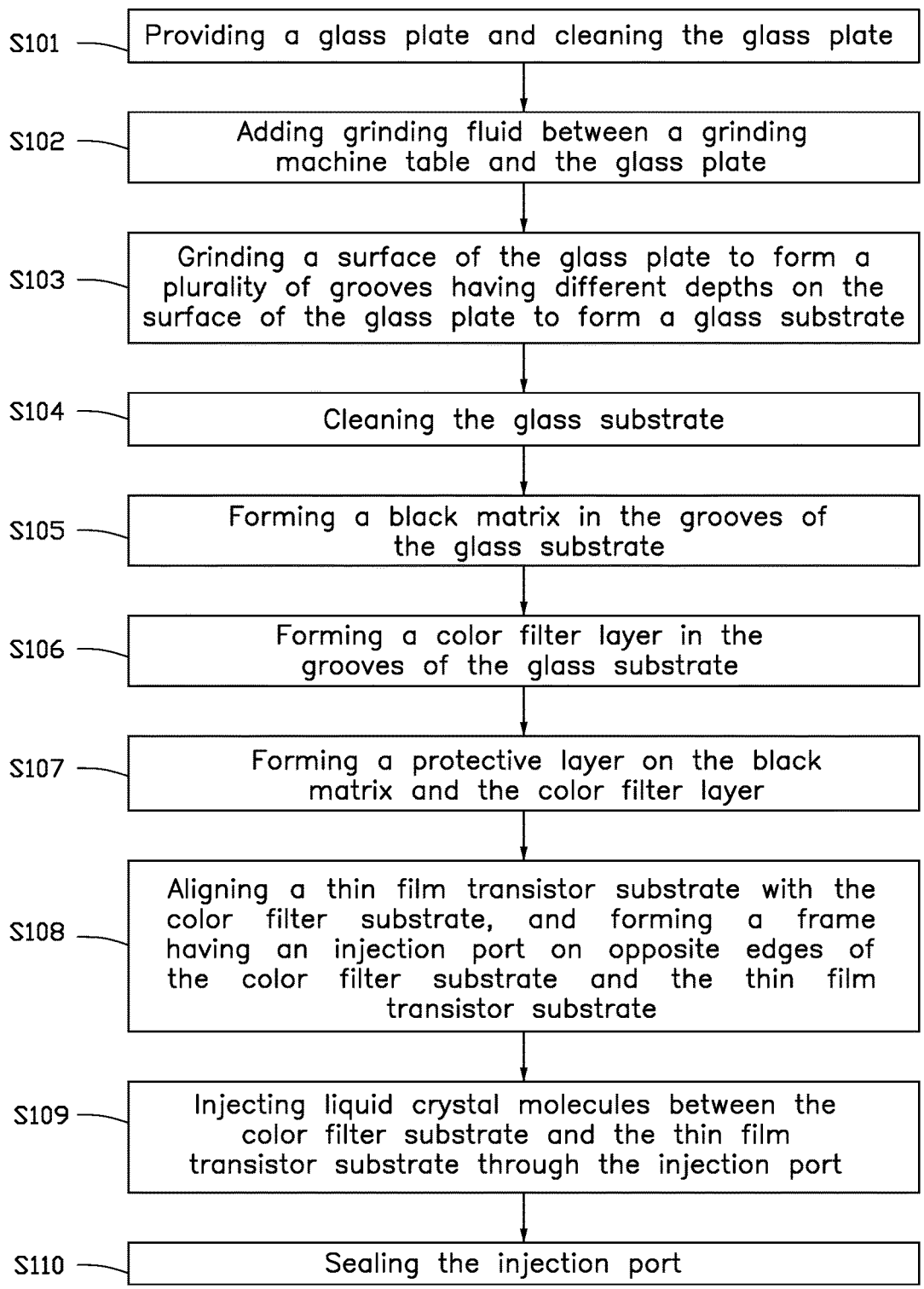
FIG. 5 is a flowchart of a method for making a liquid crystal display panel according to another embodiment of the present disclosure.

As shown in FIG. 5, a method for making the liquid crystal display panel includes the following steps.

Step S101, providing a glass plate having opposite plane surfaces, and cleaning the glass plate.

Step S102, adding grinding fluid between a grinding machine table and the surface of the glass plate. The grinding fluid is nano diamond grinding fluid.

Step S103, grinding a surface of the glass plate to form a plurality of grooves having different depths on the surface of the glass plate to form a glass substrate. The pressures between the grinding machine table and different positions of the glass plate are made to be different by using grinding machine tables having different curvature.

Step S104, cleaning the glass substrate.

Step S105, forming a black matrix in the grooves of the glass substrate.

Step S106, forming a color filter layer in the grooves of the glass substrate. The color filter layer includes red filter layers, green filter layers, and blue filter layers, and the filter layers are spaced apart from each other by the black matrix.

Step S107, forming a protective layer on the black matrix and the color filter layer. A thickness of the protective layer is generally constant. Thus far, a color filter substrate is formed.

Step S108, aligning a thin film transistor substrate with the color filter substrate, and forming a frame on opposite edges of the color filter substrate and the thin film transistor substrate, so that the color filter substrate and the thin film transistor substrate are aligned and adhered together. The frame has an injection port.

Step S109, injecting liquid crystal molecules between the color filter substrate and the thin film transistor substrate through the injection port of the frame to form a liquid crystal layer whose thickness changes with the depths of the grooves of the glass substrate.

Step S110, sealing the injection port.

The nano diamond grinding fluid is formed by uniformly dispersing diamond powder in water, which has dispersion stability, is suitable for ultra precision polishing, and can meet the requirements of optical glass and gemstones for machining accuracy. The nano diamond grinding fluid can improve the quality of the machined surface while maintaining a high grinding rate.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A liquid crystal display panel comprising:
a thin film transistor substrate;

a color filter substrate facing the thin film transistor substrate, the color filter substrate comprising a glass substrate, a black matrix on the glass substrate, and a color filter layer on the glass substrate; both the black matrix and the color filter layer being on a side of the glass substrate facing the thin film transistor substrate;

a liquid crystal layer between the color filter substrate and the thin film transistor substrate;

wherein a surface of the glass substrate defines a plurality of grooves having different depths; both the black matrix and the color filter layer are located in the plurality of grooves;

wherein a thickness of the liquid crystal layer maintains a same change trend as depths of the plurality of grooves; any two of the plurality of grooves have different depths and each of the plurality of grooves has a constant depth; the glass substrate comprises a first side and a second side opposite to the first side; depths of the plurality of grooves gradually increases in a direction from the first side towards the second side.

2. The liquid crystal display panel of claim 1, wherein the thickness of the liquid crystal layer gradually increases in the direction from the first side towards the second side.

3. The liquid crystal display panel of claim 1, wherein a width L of each of the plurality of grooves is in a range of 0.8 cm-1.2 cm, and a depth difference between two adjacent of the plurality of grooves is in a range of 0.1 µm-1 µm.

4. The liquid crystal display panel of claim 1, wherein the color filter substrate further comprises a protective layer covering both the color filter layer and the black matrix; the protective layer is between the black matrix and the liquid crystal layer; a thickness of the protective layer keeps constant such that the thickness of the liquid crystal layer maintains the same change trend as the depths of the plurality of grooves.

5. A display device comprising:
a backlight module;
a liquid crystal display panel on the backlight module, the liquid crystal display panel comprising:
a thin film transistor substrate;
a color filter substrate facing the thin film transistor substrate, the color filter substrate comprising a glass substrate, a black matrix on the glass substrate, and a color filter layer on the glass substrate; both the black matrix and the color filter layer being on a side of the glass substrate facing the thin film transistor substrate;
a liquid crystal layer between the color filter substrate and the thin film transistor substrate;
wherein a surface of the glass substrate defines a plurality of grooves having different depths; both the black matrix and the color filter layer are located in the plurality of grooves;
wherein a thickness of the liquid crystal layer maintains a same change trend as depths of the plurality of grooves; any two of the plurality of grooves have different depths and each of the plurality of grooves has a constant depth; the glass substrate comprises a first side and a second side opposite to the first side; depths of the plurality of grooves gradually increases in a direction from the first side towards the second side.

6. The display device of claim 5, wherein the thickness of the liquid crystal layer gradually increases in the direction from the first side towards the second side.

7. The display device of claim 5, wherein a width L of each of the plurality of grooves is in a range of 0.8 cm-1.2 cm, and a depth difference between two adjacent of the plurality of grooves is in a range of 0.1 µm-1 µm.

8. The display device of claim 5, wherein the color filter substrate further comprises a protective layer covering both the color filter layer and the black matrix; the protective layer is between the black matrix and the liquid crystal layer; a thickness of the protective layer keeps constant such that the thickness of the liquid crystal layer maintains the same change trend as the depths of the plurality of grooves.

9. A method for making a liquid crystal display panel comprising:
forming a color filter substrate, wherein forming the color filter substrate comprises providing a glass plate, defining a plurality of grooves having different depths on a surface of the glass plate, forming a black matrix and a color filter layer on the glass plate, and both the black matrix and the color filter layer are in the plurality of grooves;
aligning the color filter substrate with a thin film transistor substrate; and
forming a liquid crystal layer between the color filter substrate and the thin film transistor substrate; wherein a thickness of the liquid crystal layer maintains a same change trend as depths of the plurality of grooves;
wherein the plurality of grooves is defined to have different depths on a surface of the glass plate by wet etching;
defining the plurality of grooves further comprises:
providing a glass plate having opposite plane surfaces;
bending the glass plate so that the opposite plane surfaces of the glass plate form a concave surface and a convex surface;
etching, with an etching solution, the concave surface of the glass plate to form the plurality of grooves having different depths in the concave surface of the glass plate; and
bending the glass plate such that the convex surface becomes a flat plane.

\* \* \* \* \*